United States Patent [19]
Bair

[11] 3,856,800
[45] Dec. 24, 1974

[54] PROCESS OF PREPARING 1,4-DIHYDRO-4-OXO-7-Q-3-UNSUBSTITUTED-1,8-NAPHTHYRIDINES FROM CYCLIC ALKYLIDENYL N-(6-Q-2-PYRIDYL) AMINOMETHYLENEMALONATES

[75] Inventor: Robert K. Bair, Bethlehem, N.Y.

[73] Assignee: Sterling Drug Inc., New York, N.Y.

[22] Filed: Feb. 26, 1973

[21] Appl. No.: 335,733

[52] U.S. Cl. ... 260/296 N, 260/295 R, 260/295.5 B, 260/295 N, 424/266
[51] Int. Cl............................................ C07d 31/42
[58] Field of Search ................. 260/295.5 B, 296 N

[56] References Cited
FOREIGN PATENTS OR APPLICATIONS
1,022,214   3/1966   Great Britain ................. 260/295 N OTHER PUBLICATIONS
Lappin et al., Journal of Organic Chemistry, Vol. 15, pp. 377–380, William & Wilkins Pub., (1950), QD 241J.6.

*Primary Examiner*—Alan L. Rothman
*Attorney, Agent, or Firm*—Robert K. Bair; E. Woodrow Wyatt

[57] ABSTRACT

Process comprises the combination of the three steps of reacting cyclic alkylidenyl N-(6-Q-2-pyridyl)aminomethylenemalonate (I), where Q is lower-alkyl, 4(or 3)-pyridyl or 4(or 3)-pyridyl having one or two lower-alkyl substituents, with an oxidizing agent capable of converting pyridines to pyridine-N-oxides to produce cyclic alkylidenyl N-(6-Q'-1-oxo-2-pyridyl)aminomethylenemalonate (II), where Q' is lower-alkyl, 1-oxo-4(or 3)-pyridyl or 1-oxo-4(or 3)-pyridyl having one or two lower-alkyl substituents, heating said 6-Q'-1-oxo-2-pyridyl compound to produce 1,4-dihydro-4-oxo-7-Q'-1,8-naphthyridine-8-oxide (III), which is tautomeric with 4-hydroxy-7-Q'-1,8-naphthyridine-8-oxide (IIIA), and converting said 8-oxide (III or IIIA) to 1,4-dihydro-4-oxo-7-Q-1,8-naphthyridine (IV), which is tautomeric with 4-hydroxy-7-Q-1,8-naphthyridine (IVA).

12 Claims, No Drawings

3,856,800

PROCESS OF PREPARING 1,4-DIHYDRO-4-OXO-7-Q-3-UNSUBSTITUTED-1,8-NAPHTHYRIDINES FROM CYCLIC ALKYLIDENYL N-(6-Q-2-PYRIDYL) AMINOMETHYLENEMALONATES

PROCESS

This invention relates to steps in the process of preparing 4-oxo-1,8-naphthyridines.

The invention in a process aspect comprises the combination of the three steps of reacting cyclic alkylidenyl N-(6-Q-2-pyridyl)aminomethylenemalonate (I), where Q is lower-alkyl, 4(or 3)-pyridyl or 4(or 3)-pyridyl having one or two lower-alkyl substituents, with an oxidizing agent capable of converting pyridines to pyridine-N-oxides to produce cyclic alkylidenyl N-(6-Q'-1-oxo-2-pyridyl)aminomethylenemalonate (II), where Q' is lower-alkyl, 1-oxo-4(or 3)-pyridyl or 1-oxo-4(or 3)-pyridyl having one or two lower-alkyl substituents, heating said 6-Q'-1-oxo-2-pyridyl compound to produce 1,4-dihydro-4-oxo-7-Q'-1,8-naphthyridine-8-oxide (III), which is tautomeric with 4-hydroxy-7-Q'-1,8-naphthyridine-8-oxide (IIIA), and converting said 8-oxide (III or IIIA) to 1,4-dihydro-4-oxo-7-Q-1,8-naphthyridine (IV) which is tautomeric with 4-hydroxy-7-Q-1,8-naphthyridine (IVA). In addition to said combination of the three steps, other process aspects of the invention are each individual step and the two combinations of two consecutive steps.

As disclosed and claimed in the copending Lesher and Gruett U.S. Patent application Ser. No. 335,734, filed even date herewith, the 1,4-dihydro-4-oxo-7-Q-1,8-naphthyridine (IV) or tautomer (IVA) is first reacted with a hydroxymethylating agent to produce 1,4-dihydro-3-hydroxymethyl-4-oxo-7-Q-1,8-naphthyridine, which is reacted with a lower-alkylating agent to produce 1-(lower-alkyl)-1,4-dihydro-3-hydroxymethyl-4-oxo-7-Q-1,8-naphthyridine, which, in turn, is reacted with an oxidizing agent to produce 1-(lower-alkyl)-1,4-dihydro-4-oxo-7-Q-1,8-naphthyridine-3-carboxylic acids, which are known antibacterial agents.

The 8-oxide (III) or its tautomer (IIIA) where Q' is methyl also has further utility as an intermediate in the preparation of antibacterial agents. For example, reaction of the 8-oxide (III or IIIA) with a lower-alkanoic acid anhydride produces 7-(lower-alkanoyloxymethyl)-1,4-dihydro-4-oxo-1,8-naphthyridine (or 4-hydroxy tautomer) which also is shown as an intermediate in said Lesher and Gruett U. S. Patent application Ser. No. 335,734.

The 1-oxo-2-pyridyl product (II) of the first step of the instant invention is illustrated by the following formula II

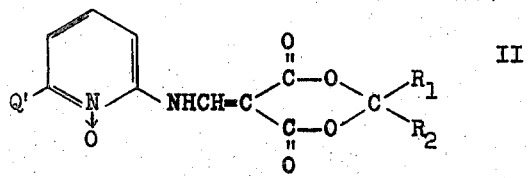

where $R_1$ and $R_2$ are each lower-alkyl, each being methyl in preferred embodiments, and Q' is lower-alkyl, 1-oxo-4(or 3)-pyridyl or 1-oxo-4(or 3)-pyridyl having one or two lower-alkyl substituents, preferred embodiments of II having Q' as methyl, 4-pyridyl, 3-pyridyl, 2-methyl-4-pyridyl or 2,6-dimethyl-4-pyridyl.

The tautomeric products of the respective second and third steps, i.e., III and IIIA, and IV and IVA, are illustrated structurally for IV and IVA as follows:

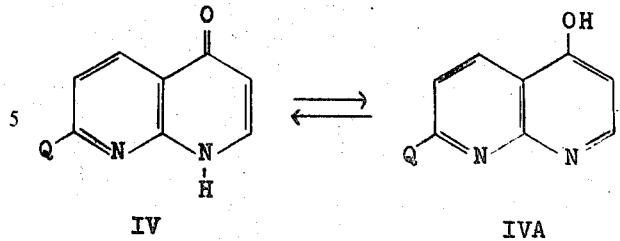

where Q is defined as above.

The term "lower-alkyl," as used herein, e.g., as Q' in II, III or IIIA, or as Q in IV or IVA, means alkyl radicals having from one to six carbon atoms which can be arranged as straight- or branched-chains, illustrated by methyl, ethyl, n-propyl, isopropyl, n-butyl, sec-butyl, isobutyl, n-amyl, n-hexyl, and the like.

The term "lower-alkanoyl," as used herein, e.g., in the definition of the 7-(lower-alkanoyloxymethyl) compounds derived from III (or IIIA), means alkanoyl radicals having from one to six carbon atoms, including the straight- and branched-chain radicals, illustrated by formyl, acetyl, propionyl (propanoyl), butyryl (butanoyl), isobutyryl (2-methylpropanoyl) and caproyl (hexanoyl).

Illustrative of the Q substituent in I, IV or IVA where Q is 4(or 3)-pyridyl having one or two lower-alkyl substituents are the following: 2-methyl-4-pyridyl, 2,6-dimethyl-4-pyridyl, 3-methyl-4-pyridyl, 2-methyl-3-pyridyl, 6-methyl-3-pyridyl (preferably named 2-methyl-5-pyridyl), 2,3-dimethyl-4-pyridyl, 2,5-dimethyl-4-pyridyl, 2-ethyl-4-pyridyl, 2isopropyl-4-pyridyl, 2-n-butyl-4-pyridyl, 2-n-hexyl-4-pyridyl, 2,6-diethyl-4-pyridyl, 2,6-diethyl-3-pyridyl, 2,6-diisopropyl-4-pyridyl, 2,6-di-n-hexyl-4-pyridyl, and the like. Because of ready availability, ease of preparation and/or high antibacterial activity of the final products, i.e., the 1-(lower-alkyl)-1,4-dihydro-7-[mono(or di)-(lower-alkyl)-4(or 3)-pyridyl]-4-oxo-1,8-naphthyridine-3-carboxylic acids, preferred embodiments of this group are those where 4(or 3)-pyridyl is substituted by one or two methyls, especially the 2-methyl-4-pyridyl and 2,6-dimethyl-4-pyridyl compounds. Other preferred embodiments are those having unsubstituted 4(or 3)-pyridyl as Q.

As shown above, 1,4-dihydro-4-oxo-7-Q'-1,8-naphthyridine-8-oxide (III) is tautomeric with 4-hydroxy-7-Q'-1,8-naphthyridine-8-oxide (IIIA), and, also, 1,4-dihydro-4-oxo-7-Q-1,8-naphthyridine (IV) is tautomeric with 4-hydroxy-7-Q-1,8-naphthyridine (IVA). As with all tautomeric systems, the rate of the transformation III ⇌ IIIA or IV ⇌ IVA and the ratio III/IIIA or IV/IVA are dependent on the thermodynamic environment, including the state of aggregation; so that measurements by any particular techniques do not necessarily have validity except under the conditions of the measurement, thereby, among other consequences, giving rise to problems for any simple designation of the physical embodiments. Thus, measurements of the infrared spectra, in potassium bromide admixture, or in chloroform or mineral oil, indicate existence predominantly as III or IV and the names of the compounds herein therefore are preferably based on structure III or IV, although it is understood that either or both structures of each tautomeric pair are comprehended.

The intermediate cyclic alkylidenyl N-[6-(lower-alkyl)-2-pyridyl]aminomethylenemalonates are generally known and are prepared by the known method of reacting a 2-amino-6-(lower-alkyl)-pyridine with a mixture of a tri-(lower-alkyl) orthoformate (V) of the formula HC(OR')$_3$ and a cyclic alkylidenyl malonate of the formula VI

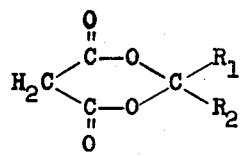

where $R_1$, $R_2$ and $R'$ are each lower-alkyl, and optionally $R_1$ and $R_2$ can be joined to each other and together with the carbon atom attached to the two oxygen atoms in VI to form a cycloalkylidenyl ring moiety having from three to six ring-carbon atoms. The compounds of formula VI are known. This method also has been used to prepare the cyclic alkylidenyl N-[6-(lower-alkyl)-1-oxo-2-pyridyl]aminomethylenemalonates (II) by reacting 2-amino-6-(lower-alkyl)-pyridine-N-oxide with a tri-(lower-alkyl) orthoformate and cyclic alkylidenyl malonate. The only heretofore known use for these 1-oxo-2-pyridyl compounds (II) has been "as characterizing derivatives" of the cyclic alkylidenyl N-[6-(lower-alkyl)-2-pyridyl]aminomethylenemalonates (I) although not having been directly prepared from them, rather only via the longer route using 2-amino-6-(lower-alkyl)pyridine-N-oxide which was prepared in the three steps, as illustrated for the compound where 6-(lower-alkyl) is 6-methyl, of reacting 2-amino-6-methylpyridine with acetic anhydride to produce 2-acetylamino-6-methylpyridine, reacting the latter with peracetic acid to form 2-acetylamino- 6-methylpyridine-N-oxide and hydrolyzing the 2-acetylamino compound with aqueous alkali hydroxide solution to yield 2-amino-6-methylpyridine-N-oxide.

The intermediate cyclic alkylidenyl N-(6-Q-2-pyridyl)aminomethylenemalonates where Q is 4(or 3-pyridyl) or 4(or 3)-pyridyl having one or two lower-alkyl substituents are prepared by the above-noted known method for preparing the corresponding compounds where Q is lower-alkyl, that is by reacting 2-amino-6-Q-pyridine with a mixture of a tri-(lower-alkyl) orthoformate (V) and cyclic alkylidenyl malonate (VI). The 2-amino-6-pyridines where Q is 4(or 3)-pyridyl or said alkylated-4(or3)-pyridyl are generally known and are prepared by known procedures.

The molecular structures of the compounds used in and prepared by the process of the invention are assigned on the basis of evidence provided by infrared, ultraviolet and nuclear magnetic resonance spectra, by chromatographic mobilities, and, by the correspondence of calculated and found values for the elementary analyses for representative examples.

The manner of making and using the instant invention will now be generally described so as to enable a person skilled in the art of chemistry to make and use the same, as follows:

The reaction of cyclic alkylidenyl N-[6-Q-2-pyridyl]aminomethylenemalonate (I) with an oxidizing agent to produce cyclic alkylidenyl N-[6-Q'-1-oxo-2-pyridyl]aminomethylenemalonate (II) is carried out by reacting I with an oxidizing agent capable of converting pyridines to pyridine-N-oxides, preferably with a per acid, e.g., peracetic acid, perbenzoic acid, 3-chloroperbenzoic acid, and the like, or with other oxidizing agents, e.g., hydrogen peroxide, in the presence of a suitable inert solvent, e.g., acetic acid, chloroform, and the like. The reaction is conveniently run by mixing the reactants carefully at room temperature (about 20°–25°C.) up to about 40°–50°C., preferably with stirring, and then heating the reaction mixture on a steam bath to ensure completion of the reaction.

The cyclization of cyclic alkylidenyl N-(6-Q'-1-oxo-2-pyridyl]aminomethylenemalonate (II) to produce 1,-4-dihydro-4-oxo-7-Q'-1,8-naphthyridine-8-oxide (III) and/or tautomer (IIIA) is carried out by heating II in an inert solvent at about 200°–325°C., preferably at about 250°–300°C. Suitable solvents include diethyl phthalate, mineral oil, dibenzyl ether, nitrobenzene, the eutectic mixture of diphenyl and diphenyl ether (Dowtherm A), and the like.

The conversion of 1,4-dihydro-4-oxo-7-Q'-1,8-naphthyridine-8-oxide (III) or its tautomer (IIIA) to the corresponding 1,4-dihydro-4-oxo-7-Q'-1,8-naphthyridine (IV) or its tautomer (IVA) is conveniently carried out by catalytically hydrogenating the 8-oxide (III or IIIA), preferably using Raney nickel, with or without a base, e.g., sodium or potassium hydroxide, and a suitable solvent inert under the reaction conditions, e.g., water or a lower-alkanol such as ethanol Other catalysts, e.g., platinum oxide or palladium-on-charcoal, can be used in removal of the 8-oxide and the 1-oxo substituent of the pyridine ring in Q' provided acidic conditions are not used. Although the conversion of III (or IIIA) to IV (or IVA) is preferably carried out by catalytic hydrogenation using Raney nickel, other means for removing oxygen from heterocyclic ring nitrogen oxides can be used, e.g., use of halogenating agents such as phosphorus oxychloride, phosphorus trichloride, thionyl chloride, and the like.

The best mode contemplated for carrying out the invention is now set forth as follows:

EXAMPLE 1

Cyclic isopropylidenyl N-(6-methyl-1-oxo-2-pyridyl)aminomethylenemalonate

To a solution containing 26.2 g. of cyclic isopropylidenyl N-(6-methyl-2-pyridyl(aminomethylenemalonate in 150 ml. of chloroform is slowly added with stirring 19 g. of 3-chloroperbenzoic acid, keeping the reaction temperature below about 40°C. After the addition is completed, the reaction mixture is heated on a steam bath for about 30 minutes. The reaction mixture is extracted successively with 65 ml. of ice cold 10% aqueous sodium bicarbonate solution, 70 ml. of water, 40 ml. of ice cold 10% aqueous sodium bicarbonate solution and 25 ml. of water. The resulting chloroform solution is washed with water, dried over anhydrous potassium carbonate, filtered and the filtrate concentrated in vacuo to remove the chloroform. The remaining solid is triturated with isopropyl alcohol and then recrystallized from ethanol using decolorizing charcoal to yield cyclic isopropylidenyl N-(6-methyl-1-oxo-2-pyridyl)aminomethylenemalonate, m.p. 222°–223°C. with decomposition.

The above preparation also is carried out using a molar equivalent quantity of other oxidizing agents in a suitable solvent inert under the reaction conditions, e.g., use of peracetic acid in acetic acid.

EXAMPLE 2

1,4-Dihydro-7-methyl-4-oxo-1,8-naphthyridine-8-oxide

To a 150 ml. portion of diethyl phthalate heated to 275°C. is added with stirring 2.78 g. of cyclic isopropylidenyl N-(6-methyl-1-oxo-2-pyridyl)aminomethylenemalonate. The stirred mixture is heated at the same temperature for two minutes and then allowed to cool to room temperature. The precipitated solid is collected, washed well with ether and air-dried to yield the product, 1,4-dihydro-7-methyl-4-methyl-4-oxo-1,8-naphthyridine-8-oxide, which is tautomeric with 4-hydroxy-7-methyl-1,8-naphthyridine-8-oxide. Recrystallization, if desired, is carried out using dimethylformamide.

The above cyclization also is carried out in 225 ml. of refluxing Dowtherm A in place of the diethyl phthalate.

EXAMPLE 3

1,4-Dihydro-7-methyl-4-oxo-1,8-naphthyridine

A mixture containing 8.75 g. of 1,4-dihydro-7-methyl-4-oxo-1,8-naphthyridine-8-oxide, 250 ml. of absolute ethanol and 5 g. of Raney nickel is hydrogenated at about 25°C. in a Parr apparatus using an initial pressure of 55 p.s.i. of hydrogen. The catalyst is filtered off, the filtrate treated with decolorizing charcoal and filtered, and the filtrate concentrated in vacuo and chilled. The precipitate is collected, recrystallized from ethanol and dried over $P_2O_5$ at 25°C. overnight to yield 1,4-dihydro-7-methyl-4-oxo-1,8-naphthyridine, m.p. 240°–241°C.

Following the procedure described in Example 1 but using in place of cyclic isopropylidenyl N-(6-methyl-2-pyridyl)aminomethylenemalonate a molar equivalent quantity of the appropriate cyclic alkylidenyl N-(6-Q-2-pyridyl)aminomethylenemalonate, the compounds of Examples 4-18 are obtained:

EXAMPLE 4

Cyclic isopropylidenyl N-(6-ethyl-1-oxo-2-pyridyl)aminomethylenemalonate using cyclic isopropylidenyl N-(6-ethyl-2-pyridyl)aminomethylenemalonate, the latter prepared by reacting 2-amino-6-ethylpyridine with a mixture of triethyl orthoformate and cyclic isopropylidenyl malonate.

EXAMPLE 5

Cyclic isopropylidenyl N-(1-oxo-6-n-propyl-2-pyridyl)aminomethylenemalonate using cylic isopropylidenyl N-(6-n-propyl-2-pyridyl)aminomethylenemalonate, the latter prepared by reacting 2-amino-6-n-propylpyridine with a mixture of triethyl orthoformate and cyclic isopropylidenyl malonate.

EXAMPLE 6

Cyclic isopropylidenyl N-(6-isopropyl-1-oxo-2-pyridyl)aminomethylenemalonate using cyclic isopropylidenyl N-(6-isopropyl-2-pyridyl)aminomethylenemalonate, the latter prepared by reacting 2-amino-6-isopropylpyridine with a mixture of triethyl orthoformate and cyclic isopropylidenyl malonate.

EXAMPLE 7

Cyclic isopropylidenyl N-(6-n-butyl-1-oxo-2-pyridyl)aminomethylenemalonate using cyclic isopropylidenyl N-(6-n-butyl-2-pyridyl)aminomethylenemalonate, the latter prepared by reacting 2-amino-6-n-butylpyridine with a mixture of triethyl orthoformate and cyclic isopropylidenyl malonate.

EXAMPLE 8

Cyclic isopropylidenyl N-(6-n-hexyl-1-oxo-2-pyridyl)aminomethylenemalonate using cyclic isopropylidenyl N-(6-n-hexyl-2-pyridyl)aminomethylenemalonate, the latter prepared by reacting 2-amino-6-n-hexylpyridine with a mixture of triethyl orthoformate and cyclic isopropylidenyl malonate.

EXAMPLE 9

Cyclic 3-pentylidenyl N-(6-methyl-1-oxo-2-pyridyl)aminomethylenemalonate using cyclic 3-pentylidenyl N-(6-methyl-2-pyridyl)aminomethylenemalonate, the latter prepared by reacting 2-amino-6-methylpyridine with a mixture of triethyl orthoformate and cyclic 3-pentylidenyl malonate.

EXAMPLE 10

Cyclic 2-butylidenyl N-(6-methyl-1-oxo-2-pyridyl)aminomethylenemalonate using cyclic 2-butylidenyl N-(6-methyl-2-pyridyl)aminomethylenemalonate, the latter prepared by reacting 2-amino-6-methylpyridine with a mixture of triethyl orthoformate and cyclic 2-butylidenyl malonate.

EXAMPLE 11

Cyclic 4-heptylidenyl N-(6-methyl-1-oxo-2-pyridyl)aminomethylenemalonate using cyclic 4-heptylidenyl N-(6-methyl-2-pyridyl)aminomethylenemalonate, the latter prepared by reacting 2-amino-6-methylpyridine with a mixture of triethyl orthoformate and cyclic 4-heptylidenyl malonate.

EXAMPLE 12

Cyclic isopropylidenyl N-[1-oxo-6-(1-oxo-4-pyridyl)-2-pyridyl]aminomethylenemalonate using cyclic isopropylidenyl N-[6-(4-pyridyl)-2-pyridyl]aminomethylenemalonate, the latter prepared by reacting 2-amino-6-(4-pyridyl)pyridine with a mixture of triethyl orthoformate and cyclic isopropylidenyl malonate.

EXAMPLE 13

Cyclic isopropylidenyl N-[1-oxo-6-(1-oxo-3-pyridyl)- 2-pyridyl]aminomethylenemalonate using cyclic isopropylidenyl N-[6-(3-pyridyl)-2-pyridyl]aminomethylenemalonate, the latter prepard by reacting 2-amino-6-(3-pyridyl)-pyridine with a mixture of triethyl orthoformate and cyclic isopropylidenyl malonate.

EXAMPLE 14

Cyclic isopropylidenyl N-[1-oxo-6-(2-methyl-1-oxo-4-pyridyl)-2-pyridyl]aminomethylenemalonate using cyclic isopropylidenyl N-[6-(2-methyl-4-pyridyl)-2-pyridyl]aminomethylenemalonate, the latter prepared by reacting 2-amino-6-(2-methyl-4-pyridyl)pyridine with a mixture of triethyl orthoformate and cyclic isopropylidenyl malonate.

EXAMPLE 15

Cyclic isopropylidenyl N-[1-oxo-6-(2-ethyl-1-oxo-4-pyridyl)-2-pyridyl]aminomethylenemalonate using cyclic isopropylidenyl N-[6-(2-ethyl-4-pyridyl)-2-pyridyl]aminomethylenemalonate, the latter prepared by reacting 2-amino-6-(2-ethyl-4-pyridyl)pyridine with a mixture of triethyl orthoformate and cyclic isopropylidenyl malonate.

EXAMPLE 16

Cyclic isopropylidenyl N-[1-oxo-6-(3-ethyl-1-oxo-4-pyridyl)-2pyridyl]aminomethylenemalonate using cyclic isopropylidenyl N-[6-(3-ethyl-4-pyridyl)-2-pyridyl]aminomethylenemalonate, the latter prepared by reacting 2-amino-6-(3-ethyl-4-pyridyl)pyridine with a mixture of triethyl orthoformate and cyclic isopropylidenyl malonate.

EXAMPLE 17

Cyclic isopropylidenyl N-[1-oxo-6-(2,6-dimethyl-1-oxo-4-pyridyl)-2-pyridyl]aminomethylenemalonate using cyclic isopropylidenyl N-[6-(2,6-dimethyl-4-pyridyl)-2-pyridyl]aminomethylenemalonate, the latter prepared by reacting 2-amino-6-(2,6-dimethyl-4-pyridyl)pyridine with a mixture of triethyl orthoformate and cyclic isopropylidenyl malonate.

EXAMPLE 18

Cyclic isopropylidenyl N-[1-oxo-6-(3,5-dimethyl-1-oxo-4-pyridyl)-2-pyridyl]aminomethylenemalonate using cyclic isopropylidenyl N-[6-(3,5-dimethyl-4-pyridyl)-2-pyridyl]aminomethylenemalonate, the latter prepared by reacting 2-amino-6-(3,5-dimethyl-4-pyridyl)pyridine with a mixture of triethyl orthoformate and cyclic isopropylidenyl malonate.

Following the procedure described in Example 2 but using in place of cyclic isopropylidenyl N-(6-methyl-1-oxo-2-pyridyl)aminomethylenemalonate a molar equivalent quantity of the appropriate cyclic alkylidenyl N-(6-Q-1-oxo-2-pyridyl)aminomethylenemalonate, the compounds of Examples 19–34 are obtained:

EXAMPLE 19

7-Ethyl-1,4-dihydro-4-oxo-1,8-naphthyridine-8-oxide using cyclic isopropylidenyl N-(6-ethyl-1-oxo-2-pyridyl)aminomethylenemalonate.

EXAMPLE 20

1,4-Dihydro-4-oxo-7-n-propyl-1,8-naphthyridine-8-oxide using cyclic isopropylidenyl N-)1-oxo-6-n-propyl-2-pyridyl)aminomethylenemalonate.

EXAMPLE 21

1,4-Dihydro-7-isopropyl-4-oxo-1,8-naphthyridine-8-oxide using cyclic isopropylidenyl N-(6-isopropyl-1-oxo-2-pyridyl)aminomethylenemalonate.

EXAMPLE 22

7-n-Butyl-1,4-dihydro-4-oxo-1,8-naphthyridine-8-oxide using cyclic isopropylidenyl N-(6-n-butyl-1-oxo-2-pyridyl)aminomethylenemalonate.

EXAMPLE 23

7-n-Hexyl-1,4-dihydro-4-oxo-1,8-naphthyridine-8-oxide using cyclic isopropylidenyl N-(6-n-hexyl-1-oxy-2-pyridyl)aminomethylenemalonate.

EXAMPLE 24

1,4-Dihydro-7-methyl-4-oxo-1,8-naphthyridine-8-oxide using cyclic 3-pentylidenyl N-(6-methyl-1-oxo-2-pyridyl)aminomethylenemalonate.

EXAMPLE 25

1,4-Dihydro-7-methyl-4-oxo-1,8-naphthyridine-8-oxide using cyclic 2-butylidenyl N-(6-methyl-1-oxo-2-pyridyl)aminomethylenemalonate.

EXAMPLE 26

1,4-Dihydro-7-methyl-4-oxo-1,8-naphthyridine-8-oxide using cyclic 4-heptylidenyl N-(6-methyl-1-oxo-2-pyridyl)aminomethylenemalonate.

EXAMPLE 27

1,4-Dihydro-4-oxo-7-(1-oxo-4-pyridyl)-1,8-naphthyridine-8-using cyclic isopropylidenyl N-[1-oxo-6-(1-oxo-4-pyridyl)-2-pryidyl]aminomethylenemalonate.

EXAMPLE 28

1,4-Dihydro-4-oxo-7-(1-oxo-3-pyridyl)-1,8-naphthyridine-8-oxide using cyclic isopropylidenyl N-[1-1,8-naphthyridine-8-oxide using cyclic isopropylidenyl N-[1-oxo-6-(1-oxo-3-pyridyl)-2pyridyl]aminomethylenemalonate.

EXAMPLE 29

1,4-Dihydro-4-oxo-7-(2-methyl-1-oxo-4-pyridyl)-1,8-naphthyridine-8-oxide using cyclic isopropylidenyl N-[1-oxo-6-(2-methyl-1-oxo-4-pyridyl)-2-pyridyl]aminomethylenemalonate.

EXAMPLE 30

1,4-Dihydro-4-oxo-7-(3-methyl-1-oxo-4-pyridyl)-1,8-naphthyridine-8-oxide using cyclic isopropylidenyl N-[1-oxo-6-(3-methyl-1-oxo-4-pyridyl)-2-pyridyl]aminomethylenemalonate.

EXAMPLE 31

1,4-Dihydro-4-oxo-7-(2-ethyl-1-oxo-4-pyridyl)-1,8-naphthyridine-8-oxide using cyclic isopropylidenyl N-[1-oxo-6-(2-ethyl-1-oxo-4-pyridyl)-2-pyridyl]aminomethylenemalonate.

EXAMPLE 32

1,4-Dihydro-4-oxo-7-(3-ethyl-1-oxo-4-pyridyl)-1,8-naphthyridine-8-oxide using cyclic isopropylidenyl N-[1-oxo-6-(3-ethyl-1-oxo-4-pyridyl)-2-pyridyl]aminomethylenemalonate.

EXAMPLE 33

1,4-Dihydro-4-oxo-7-(2,6-dimethyl-1-oxo-4-pyridyl)-1,8-naphthyridine-8-oxide using cyclic isopropylidenyl N-[1-oxo-6-(2,6-dimethyl-1-oxo-4-pyridyl)-2-pyridyl]aminomethylenemalonate.

EXAMPLE 34

1,4-Dihydro-4-oxo-7-(3,5-dimethyl-1-oxo-4-pyridyl)-1,8-naphthyridine-8-oxide using cyclic isopropylidenyl N-[1-oxo-6-(3,5-dimethyl-1-oxo-4-pyridyl)-2-pyridyl]aminomethylenemalonate.

Following the procedure described in Example 3, but using in place of 1,4-dihydro-7-methyl-4-oxo-1,8-naphthyridine-8-oxide a molar equivalent quantity of the appropriate 1,4-dihydro-7-Q-4-oxo-1,8-naphthyridine-8-oxide, the compounds of Examples 35–47 are produced:

EXAMPLE 35

7-Ethyl-1,4-dihydro-4-oxo-1,8-naphthyridine using 7-ethyl-1,4-dihydro-4-oxo-1,8-naphthyridine-8-oxide.

EXAMPLE 36

1,4-Dihydro-4-oxo-7-n-propyl-1,8-naphthyridine using 1,4-dihydro-4-oxo-7-n-propyl-1,8-naphthyridine-8-oxide.

EXAMPLE 37

1,4-Dihydro-7-isopropyl-4-oxo-1,8-naphthyridine using 1,4-dihydro-7-isopropyl-4-oxo-1,8-naphthyridine-8-oxide.

EXAMPLE 38

7-n-Butyl-1,4-dihydro-4-oxo-1,8-naphthyridine using 7-n-butyl-1,4-dihydro-4-oxo-1,8-naphthyridine-8-oxide.

EXAMPLE 39

7-n-Hexyl-1,4-dihydro-4-oxo-1,8-naphthyridine using 7-n-hexyl-1,4-dihydro-4-oxo-1,8-naphthyridine-8-oxide.

EXAMPLE 40

1,4-Dihydro-4-oxo-7-(4-pyridyl)-1,8-naphthyridine using 1,4-dihydro-4-oxo-7-(1-oxo-4-pyridyl)-1,8-naphthyridine-8-oxide.

EXAMPLE 41

1,4-Dihydro-4-oxo-7-(3-pyridyl)-1,8-naphthyridine using 1,4-dihydro-4-oxo-7-(1-oxo-3-pyridyl)-1,8-naphthyridine-8-oxide.

EXAMPLE 42

1,4-Dihydro-4-oxo-7-(2-methyl-4-pyridyl)-1,8-naphthyridine using 1,4-dihydro-4-oxo-7-(2-methyl-1-oxo-4-pyridyl)-1,8-naphthyridine-8-oxide.

EXAMPLE 43

1,4-Dihydro-4-oxo-7-(3-methyl-4-pyridyl)-1,8-naphthyridine using 1,4-dihydro-4-oxo-7-(3-methyl-1-oxo-4-pyridyl)-1,8-naphthyridine-8-oxide.

EXAMPLE 44

1,4-Dihydro-4-oxo-7-(2-ethyl-4-pyridyl)-1,8-naphthyridine using 1,4-dihydro-4-oxo-7-(2-ethyl-1oxo-4-pyridyl)-1,8-naphthyridine-8-oxide.

EXAMPLE 45

1,4-Dihydro-4-oxo-7-(3-ethyl-4-pyridyl)-1,8-naphthyridine using 1,4-dihydro-4-oxo-7-(3-ethyl-1-oxo-4-pyridyl)-1,8-naphthyridine-8-oxide.

EXAMPLE 46

1,4-Dihydro-4-oxo-7-(2,6-dimethyl-4-pyridyl)-1,8-naphthyridine using 1,4-dihydro-4-oxo-7-(2,6-dimethyl-1-oxo-4-pyridyl)-1,8-naphthyridine-8-oxide.

EXAMPLE 47

1,4-Dihydro-4-oxo-7-(3,5-dimethyl-4-pyridyl)-1,8-naphthyridine using 1,4-dihydro-4-oxo-7-(3,5-dimethyl-1-oxo-4-pyridyl)-1,8-naphthyridine-8-oxide.

Utilization of the foregoing 1,4-dihydro-4-oxo-7-Q-1,8-naphthyridines in the procedure disclosed and claimed in said copending Lesher and Gruett U.S. Patent application Ser. No. 335,734 is illustrated as follows [Illustrations 1–63]:

1.

1,4-Dihydro-3-hydroxymethyl-7-methyl-4-oxo-1,8-naphthyridine

To a solution containing 1.6 g. of 1,4-dihydro-7-methyl-4-oxo-1,8-naphthyridine (tautomeric with 4-hydroxy-7-methyl-1,8-naphthyridine), 5.5 ml. of 2N aqueous potassium hydroxide solution and 10 ml. of water was added with stirring 0.8 ml. of formaldehyde (35–40%) and the resulting reaction mixture was heated on a steam bath for two and one-half hours. After standing at room temperature (about 20°–25°C.) overnight (about 18 hours), the reaction mixture was filtered and the filtrate was cooled in an ice bath. The resulting precipitate was collected, washed with water, dried and found to have a melting point greater than 300°C. The solid product was recrystallized from 10 ml. of dimethylformamide using decolorizing charcoal, washed with ether, dried in vacuo at 70°C. to yield 0.6 g. 1,4-dihydro-3-hydroxymethyl-7-methyl-4-oxo-1,8-naphthyridine, which is tautomeric with 4-hydroxy-3-hydroxymethyl-7-methyl-1,8-naphthyridine.

2.

1-Ethyl-1,4-dihydro-3-hydroxymethyl-7-methyl-4-oxo-1,8-naphthyridine

To a stirred suspension heated on a steam bath and containing 3.8 g. of 1,4-dihydro-3-hydroxymethyl-7-methyl-4-oxo-1,8-naphthyridine in 30 ml. of dimethylformamide is added 8.3 g. of anhydrous potassium carbonate and the mixture is stirred for about fifteen minutes. To the stirred hot mixture is added 3.8 g. of ethyl iodide and the resulting mixture is stirred with heating on the steam bath for ninety minutes. The hot reaction mixture is filtered and the filtrate chilled. The resulting crystalline precipitate is collected, triturated with warm water, washed sparingly with warm water and dried in vacuo at 60°C. to yield 1-ethyl-1,4-dihydro-3-hydroxymethyl-7-methyl-4-oxo-1,8-naphthyridine. If desired, this compound can be recrystallized from dimethylformamide.

3.

1-Ethyl-1,4-dihydro-7-methyl-4-oxo-1,8-naphthyridine-3-carboxylic acid

A suspension of 2.2 g. of 1-ethyl-1,4-dihydro-3-hydroxymethyl-7-methyl-4-oxo-1,8-naphthyridine in 25 ml. of pyridine and 5 ml. of water is stirred and cooled to 10°C. in the ice bath. Solid potassium permanganate (5g.) is added in small portions over the course of about 55 minutes. The temperature is not allowed to rise above 15°C. and small amounts of water totalling 25 ml. is added during the course of the addition. The resulting mixture is stirred about thirty minutes longer at 10°–20°C. and then filtered through infusorial earth. The cake of collected manganese dioxide is washed with a little water and the combined filtrates are treated with saturated aqueous sodium bisulfite solution until the excess permanganate is destroyed. The paleyellow solution is then acidified with excess 6N hydrochloric acid. After cooling in ice, the precipitated solid is collected by vacuum, rinsed with fresh water and sucked as dry as possible. The material is recyrstallized from 12 ml. of dimethylformamide and dried for 18 hours in a vacuum oven (80°C.). There is obtained, as pale yellow crystals, 1-ethyl-1,4-dihydro-7-methyl-4-oxo-1,8-naphthyridine-3-carboxylic acid, m.p. 232°–234°C. A mixed melting point with authentic material is undepressed.

Following the procedure described in Illustration 1 but using in place of 1,4-dihydro-7-methyl-4-oxo-1,8-naphthyridine a molar equivalent quantity of the appropriate 1,4-dihydro-4-oxo-7-Q-1,8-naphthyridine, the compounds of Illustrations 4–19 are obtained:

4. 7-Ethyl-1,4-dihydro-3-hydroxymethyl-4-oxo-1,8-naphthyridine using 7-ethyl-1,4-dihydro-4-oxo-1,8-naphthyridine.

5. 1,4-Dihydro-3-hydroxymethyl-4-oxo-7-n-propyl-1,8-naphthyridine using 1,4-dihydro-4-oxo-7-n-propyl-1,8-naphthyridine.

6. 1,4-Dihydro-3-hydroxymethyl-7-isobutyl-4-oxo-1,8-naphthyridine using 1,4-dihydro-7-isobutyl-4-oxo-1,8-naphthyridine.

7. 7-n-Hexyl-1,4-dihydro-3-hydroxymethyl-4-oxo-1,8-naphthyridine using 7-n-hexyl-1,4-dihydro-4-oxo-1,8-naphthyridine.

8. 7-Acetoxymethyl-1,4-dihydro-3-hydroxymethyl-4-oxo-1,8-naphthyridine using 7-acetoxymethyl-1,4-dihydro-4-oxo-1,8-naphthyridine.

9. 1,4-Dihydro-3-hydroxymethyl-4-oxo-7-propionoxymethyl-1,8-naphthyridine using 1,4-dihydro-4-oxo-7-propionoxymethyl-1,8-naphthyridine.

10. 1,4-Dihydro-3-hydroxymethyl-7-isobutyroxymethyl-4-oxo-1,8-naphthyridine using 1,4-dihydro-7-isobutyroxymethyl-4-oxo-1,8-naphthyridine.

11. 7-Hexanoyloxymethyl-1,4-dihydro-3-hydroxymethyl-4-oxo-1,8-naphthyridine using 7-hexanoyloxymethyl-1,4-dihydro-4-oxo-1,8-naphthyridine.

12. 1,4-Dihydro-3-hydroxymethyl-4-oxo-7-(4-pyridyl)-1,8-naphthyridine using 1,4-dihydro-4-oxo-7-(4-pyridyl)-1,8-naphthyridine.

13. 1,4-Dihydro-3-hydroxymethyl-4-oxo-7-(3-pyridyl)-1,8-naphthyridine using 1,4-dihydro-4-oxo-7-(3-pyridyl)-1,8-naphthyridine.

14. 1,4-Dihydro-3-hydroxymethyl-7-(2-methyl-4-pyridyl)-4-oxo-1,8-naphthyridine using 1,4-dihydro-7-(2-methyl-4-pyridyl)-4-oxo-1,8-naphthyridine.

15. 1,4-Dihydro-3-hydroxymethyl-7-(3-methyl-4-pyridyl)-1,8-naphthyridine using 1,4-dihydro-7-(3-methyl-4-pyridyl)-4-oxo-1,8-naphthyridine.

16. 7-(2-Ethyl-4-pyridyl)-1,4-dihydro-3-hydroxymethyl-4-oxo-1,8-naphthyridine using 7-(2-ethyl-4-pyridyl)-1,4-dihydro-4-oxo-1,8-naphthyridine.

17. 7-(3-Ethyl-4-pyridyl)-1,4-dihydro-3-hydroxymethyl-4-oxo-1,8-naphthyridine using 7-(3-ethyl-4-pyridyl)-1,4-dihydro-4-oxo-1,8-naphthyridine.

18. 1,4-Dihydro-3-hydroxymethyl-7-(2,6-dimethyl-4-pyridyl)-4-oxo-1,8-naphthyridine using 1,4-dihydro-7-(2,6-dimethyl-4-pyridyl)-4-oxo-1,8-naphthyridine.

19. 1,4-Dihydro-3-hydroxymethyl-7-(3,5-dimethyl-4-pyridyl)-4-oxo-1,8-naphthyridine using 1,4-dihydro-7-(3,5-dimethyl-4-pyridyl)-4-oxo-1,8-naphthyridine.

Following the procedure described in Illustration 2 but using in place of 1,4-dihydro-3-hydroxymethyl-7-methyl-4-oxo-1,8-naphthyridine a moloar equivalent quantity of the appropriate 1,4-dihydro-3-hydroxymethyl-4-oxo-7-Q-1,8-naphthyridine, the compounds of Illustrations 20–35 are obtained:

20. 1,7-Diethyl-1,4-dihydro-3-hydroxymethyl-4-oxo-1,8-naphthyridine using 7-ethyl-1,4-dihydro-3-hydroxymethyl-4-oxo-1,8-naphthyridine. Similarly, using said 7-ethyl compound and a molar equivalent quantity of dimethyl sulfate, n-propyl iodide, isobutyl bromide or n-hexyl chloride in place of ethyl iodide, there is obtained 7-ethyl-1,4-dihydro-3-hydroxymethyl-1-methyl-4-oxo-1,8-naphthyridine, 7-ethyl-1,4-dihydro-3-hydroxymethyl-4-oxo-1-n-propyl-1,8-naphthyridine, 7-ethyl-1,4-dihydro-3-hydroxymethyl-1-isobutyl-4-oxo-1,8-naphthyridine or 7-ethyl-1-n-hexyl-1,4-dihydro-3-hydroxymethyl-4-oxo-1,8-naphthyridine, respectively.

21. 1-Ethyl-1,4-dihydro-3-hydroxymethyl-4-oxo-7-n-propyl-1,8-naphthyridine using 1,4-dihydro-3-hydroxymethyl-4-oxo-7-n-propyl-1,8-naphthyridine.

22. 1-Ethyl-1,4-dihydro-3-hydroxymethyl-7-isobutyl-4-oxo-1,8-naphthyridine using 1,4-dihydro-3-hydroxymethyl-7-isobutyl-4-oxo-1,8-naphthyridine.

23. 1-Ethyl-7-n-hexyl-1,4-dihydro-3-hydroxymethyl-4-oxo-1,8-naphthyridine using 7-n-hexyl-1,4-dihydro-3-hydroxymethyl-4-oxo-1,8-naphthyridine.

24. 7-Acetoxymethyl-1-ethyl-1,4-dihydro-3-hydroxymethyl-4-oxo-1,8-naphthyridine using 7-acetoxymethyl-1,4-dihydro-3-hydroxymethyl-4-oxo-1,8-naphthyridine. Similarly, using said 7-acetoxymethyl compound and a molar equivalent quantity of dimethyl sulfate, n-propyl iodide, isobutyl bormide or n-hexyl chloride in place of ethyl iodide, there is obtained 7-acetoxymethyl-1,4-dihydro-3-hydroxymethyl-1-methyl-4-oxo-1,8-naphthyridine, 7-acetoxymethyl-1,4-dihydro-3-hydroxymethyl-4-oxo-1-n-propyl-1,8-naphthyridine, 7-acetoxymethyl-1,4-dihydro-3-hydroxymethyl-1-isobutyl-4-oxo-1,8-naphthyridine or 7-acetoxymethyl-1-n-hexyl-1,4-dihydro-3-hydroxymethyl-4-oxo-1,8-naphthyridine, respectively.

25. 1-Ethyl-1,4-dihydro-3-hydroxymethyl-4-oxo-7-propionoxymethyl-1,8-naphthyridine using 1,4-dihydro-3-hydroxymethyl-4-oxo-7-propionoxymethyl-1,8-naphthyridine.

26. 1-Ethyl-1,4-dihydro-3-hydroxymethyl-7-isobutyroxymethyl-4-oxo-1,8-naphthyridine using 1,4-dihydro-3-hydroxymethyl-7-isobutyroxymethyl-4-oxo-1,8-naphthyridine.

27. 1-Ethyl-7-hexanoyloxymethyl-1,4-dihydro-3-hydroxymethyl-4-oxo-1,8-naphthyridine using 7-hexanoyloxymethyl-1,4-dihydro-3-hydroxymethyl-4-oxo-1,8-naphthyridine.

28. 1-Ethyl-1,4-dihydro-3-hydroxymethyl-4-oxo-7-(4-pyridyl)-1,8-naphthyridine using 1,4-dihydro-3-hydroxymethyl-4-oxo-7-(4-pyridyl)-1,8-naphthyridine. Similarly, using said 7-(4-pyridyl) compound and a molar equivalent quantity of dimethyl sulfate, n-propyl iodide, isobutyl bromide or n-hexyl chloride in place of ethyl iodide, there is obtained 1,4-dihydro-3-hydroxymethyl-1-methyl-4-oxo-7-(4-pyridyl)-1,8-naphthyridine, 1,4-dihydro-3-hydroxymethyl-4-oxo-1-n-propyl-7-(4-pyridyl)-1,8-naphthyridine, 1,4-dihydro-3-hydroxymethyl-1-isobutyl-4-oxo-7-(4-pyridyl)-1,8-naphthyridine or 1-n-hexyl-1,4-dihydro-3-hydroxymethyl-4-oxo-7-(4-pyridyl)-1,8-naphthyridine, respectively.

29. 1-Ethyl-1,4-dihydro-3-hydroxymethyl-4-oxo-7-(3-pyridyl)-1,8-naphthyridine using 1,4-dihydro-3-hydroxymethyl-4-oxo-7-(3-pyridyl)-1,8-naphthyridine.

30. 1-Ethyl-1,4-dihydro-3-hydroxymethyl-7-(2-methyl-4-pyridyl)-4-oxo-1,8-naphthyridine using 1,4-dihydro-3-hydroxymethyl-7-(2-methyl-4-pyridyl)-4-oxo-1,8-naphthyridine.

31. 1-Ethyl-1,4-dihydro-3-hydroxymethyl-7-(3-methyl-4-pyridyl)-1,8-naphthyridine using 1,4-dihydro-3-hydroxymethyl-7-(3-methyl-4-pyridyl)-4-oxo-1,8-naphthyridine.

32. 1-Ethyl-7-(2-ethyl-4-pyridyl)-1,4-dihydro-3-hydroxymethyl-4-oxo-1,8-naphthyridine using 7-(2-ethyl-4-pyridyl)-1,4-dihydro-3-hydroxymethyl-4-oxo-1,8-naphthyridine.

33. 1-Ethyl-7-(3-ethyl-4-pyridyl)-1,4-dihydro-3-hydroxymethyl-4-oxo-1,8-naphthyridine using 7-(3-ethyl-4-pyridyl)-1,4-dihydro-3-hydroxymethyl-4-oxo-1,8-naphthyridine.

34. 1-Ethyl-1,4-dihydro-3-hydroxymethyl-7-(2,6-dimethyl-4-pyridyl)-4-oxo-1,8-naphthyridine using 1,4-dihydro-3-hydroxymethyl-7-(2,6-dimethyl-4-pyridyl)-4-oxo-1,8-naphthyridine.

35. 1-Ethyl-1,4-dihydro-3-hydroxymethyl-7-(3,5-dimethyl-4-pyridyl)-4-oxo-1,8-naphthyridine using 1,4-dihydro-3-hydroxymethyl-7-(3,5-dimethyl-4-pyridyl)-4-oxo-1,8-naphthyridine.

Following the procedure described in Illustration 3 but using a molar equivalent quantity of the appropriate 1-alkyl-1,4-dihydro-3-hydroxymethyl-4-oxo-7-Q-1,8-naphthyridine in place of 1-ethyl-1,4-dihydro-3-hydroxymethyl-7-methyl-4-oxo-1,8-naphthyridine, there are obtained the corresponding 1-alkyl-1,4-dihydro-4-oxo-7-Q-1,8-naphthyridine-3-carboxylic acids of Illustrations 36–63.

36. 1,7-Diethyl-1,4-dihydro-4-oxo-1,8-naphthyridine-3-carboxylic acid using 1,7-diethyl-1,4-dihydro-3-hydroxymethyl-4-oxo-1,8-naphthyridine.

37. 7-Ethyl-1,4-dihydro-1-methyl-4-oxo-1,8-naphthyridine-3-carboxylic acid using 7-ethyl-1,4-dihydro-3-hydroxymethyl-1-methyl-4-oxo-1,8-naphthyridine.

38. 7-Ethyl-1,4-dihydro-4-oxo-1-n-propyl-1,8-naphthyridine-3-carboxylic acid using 7-ethyl-1,4-dihydro-3-hydroxymethyl-4-oxo-1-n-propyl-1,8-naphthyridine.

39. 7-Ethyl-1,4-dihydro-1-isobutyl-4-oxo-1,8-naphthyridine-3-carboxylic acid using 7-ethyl-1,4-dihydro-3-hydroxymethyl-1-isobutyl-4-oxo-1,8-naphthyridine.

40. 7-Ethyl-1-n-hexyl-1,4-dihydro-4-oxo-1,8-naphthyridine-3-carboxylic acid using 7-ethyl-1-n-hexyl-1,4-dihydro-3-hydroxymethyl-4-oxo-1,8-naphthyridine.

41. 1-Ethyl-1,4-dihydro-4-dihydro-4-oxo-7-n-propyl-1,8-naphthyridine-3-carboxylic acid using 1-ethyl-1,4-dihydro-3-hydroxymethyl-4-oxo-7-n-propyl-1,8-naphthyridine.

42. 1-Ethyl-1,4-dihydro-7-isobutyl-4-oxo-1,8-naphthyridine-3-carboxylic acid using 1-ethyl-1,4-dihydro-3-hydroxymethyl-7-isobutyl-4-oxo-1,8-naphthyridine.

43. 1-Ethyl-7-n-hexyl-1,4-dihydro-4-oxo-1,8-naphthyridine-3-carboxylic acid using 1-ethyl-7-n-hexyl-1,4-dihydro-3-hydroxymethyl-4-oxo-1,8-naphthyridine.

44. 7-Acetoxymethyl-1,4-dihydro-1-methyl-4-oxo-1,8-naphthyridine-3-carboxylic acid using 7-acetoxymethyl-1,4-dihydro-3-hydroxymethyl-1-methyl-4-oxo-1,8-naphthyridine.

45. 7-Acetoxymethyl-1,4-dihydro-4-oxo-1-n-propyl-1,8-naphthyridine-3-carboxylic acid using 7-acetoxymethyl-1,4-dihydro-3-hydroxymethyl-4-oxo-1-n-propyl-1,8-naphthyridine.

46. 7-Acetoxymethyl-1,4-dihydro-1-isobutyl-4-oxo-1,8-naphthyridine-3-carboxylic acid using 7-acetoxymethyl-1,4-dihydro-3-hydroxymethyl-1-isobutyl-4-oxo-1,8-naphthyridine.

47. 7-Acetoxymethyl-1-n-hexyl-1,4-dihydro-4-oxo-1,8-naphthyridine-3-carboxylic acid using 7-acetoxymethyl-1-n-hexyl-1,4-dihydro-3-hydroxymethyl-4-oxo-1,8-naphthyridine.

48. 7-Acetoxymethyl-1-ethyl-1,4-dihydro-4-oxo-1,8-naphthyridine-3-carboxylic acid using 7-acetoxymethyl-1-ethyl-1,4-dihydro-3-hydroxymethyl-4-oxo-1,8-naphthyridine.

49. 1-Ethyl-1,4-dihydro-4-oxo-7-propionoxymethyl-1,8-naphthyridine-3-carboxylic acid using 1-ethyl-1,4-dihydro-3-hydroxymethyl-4-oxo-7-propionoxymethyl-1,8-naphthyridine.

50. 1-Ethyl-1,4-dihydro-7-isobutyroxymethyl-4-oxo-1,8-naphthyridine-3-carboxylic acid using 1-ethyl-1,4-dihydro-3-hydroxymethyl-7-isobutyroxymethyl-4-oxo-1,8-naphthyridine.

51. 1-Ethyl-7-hexanoyloxymethyl-1,4-dihydro-4-oxo-1,8-naphthyridine-3-carboxylic acid using 1-ethyl-7-hexanoyloxymethyl-1,4-dihydro-3-hydroxymethyl-4-oxo-1,8-naphthyridine.

52. 1-Ethyl-1,4-dihydro-4-oxo-7-(4-pyridyl)-1,8-naphthyridine-3-carboxylic acid using 1-ethyl-1,4-dihydro-3-hydroxymethyl-4-oxo-7-(4-pyridyl)-1,8-naphthyridine.

53. 1,4-Dihydro-1-methyl-4-oxo-7-(4-pyridyl)-1,8-naphthyridine-3-carboxylic acid using 1,4-dihydro-3-hydroxymethyl-1-methyl-4-oxo-7-(4-pyridyl)-1,8-naphthyridine.

54. 1,4-Dihydro-4-oxo-1-n-propyl-7-(4-pyridyl)-1,8-naphthyridine-3-carboxylic acid using 1,4-dihydro-3-hydroxymethyl-4-oxo-1-n-propyl-7-(4-pyridyl)-1,8-naphthyridine.

55. 1,4-Dihydro-1-isobutyl-4-oxo-7-(4-pyridyl)-1,8-naphthyridine-3-carboxylic acid using 1,4-dihydro-3-hydroxymethyl-1-isobutyl-4-oxo-7-(4-pyridyl)-1,8-naphthyridine.

56. 1-n-Hexyl-1,4-dihydro-4-oxo-7-(4-pyridyl)-1,8-naphthyridine-3-carboxylic acid using 1-n-hexyl-1,4-dihydro-3-hydroxymethyl-4-oxo-7-(4-pyridyl)-1,8-naphthyridine.

57. 1-Ethyl-1,4-dihydro-4-oxo-7-(3-pyridyl)-1,8-naphthyridine-3-carboxylic acid using 1-ethyl-1,4-dihydro-3-hydroxymethyl-4-oxo-7-(3-pyridyl)-1,8-naphthyridine.

58. 1-Ethyl-1,4-dihydro-7-(2-methyl-4-pyridyl)-4-oxo-1,8-naphthyridine-3-carboxylic acid using 1-ethyl-1,4-dihydro-3-hydroxymethyl-7-(2-methyl-4-pyridyl)-4-oxo-1,8-naphthyridine.

59. 1-Ethyl-1,4-dihydro-7-(3-methyl-4-pyridyl)-1,8-naphthyridine-3-carboxylic acid using 1-ethyl-1,4-dihydro-3-hydroxymethyl-7-(3-methyl-4-pyridyl)-1,8-naphthyridine.

60. 1-Ethyl-7-(2-ethyl-4-pyridyl)-1,4-dihydro-4-oxo-1,8-naphthyridine-3-carboxylic acid using 1-ethyl-7-(2-ethyl-4-pyridyl)-1,4-dihydro-3-hydroxymethyl-4-oxo-1,8-naphthyridine.

61. 1-Ethyl-7-(3-ethyl-4-pyridyl)-1,4-dihydro-4-oxo-1,8-naphthyridine-3-carboxylic acid using 1-ethyl-7-(3-ethyl-4-pyridyl)-1,4-dihydro-3-hydroxymethyl-4-oxo-1,8-naphthyridine.

62. 1-Ethyl-1,4-dihydro-7-(2,6-dimethyl-4-pyridyl)-4-oxo-1,8-naphthyridine-3-carboxylic acid using 1-ethyl-1,4-dihydro-3-hydroxymethyl-7-(2,6-dimethyl-4-pyridyl)-4-oxo-1,8-naphthyridine.

63. 1-Ethyl-1,4-dihydro-7-(3,5-dimethyl-4-pyridyl)-4-oxo-1,8-naphthyridine-3-carboxylic acid using 1-ethyl-1,4-dihydro-3-hydroxymethyl-7-(3,5-dimethyl-4-pyridyl)-4-oxo-1,8-naphthyridine.

We claim:

1. The process which comprises reacting cyclic alkylidenyl N-(6-Q-2-pyridyl)aminomethylenemalonate with an oxidizing agent capable of converting pyridines to pyridine N-oxides to produce cyclic alkylidenyl N-(6-Q'-1-oxo-2-pyridyl)aminomethylenemalonate, heating said 1-oxo-2-pyridyl compound to produce 1,4-dihydro-4-oxo-7-Q'-1,8-naphthyridine-8-oxide and converting said 8-oxide to 1,4-dihydro-4-oxo-7-Q-1,8-naphthyridine; where Q is lower-alkyl, 4(or 3)-pyridyl or 4(or 3)-pyridyl having one or two lower-alkyl substituents and Q' is lower-alkyl, 1-oxo-4(or 3)-pyridyl or 1-oxo-4(or 3)-pyridyl having one or two lower-alkyl substituents.

2. The process which comprises reacting cyclic alkylidenyl N-(6-Q-2-pyridyl)aminomethylenemalonate with an oxidizing agent capable of converting pyridines to pyridine N-oxides to produce cyclic alkylidenyl N-(6-Q'-1-oxo-2-pyridyl]aminomethylenemalonate, where Q is lower-alkyl 4(or 3)-pyridyl or 4(or 3)-pyridyl having one or two lower-alkyl substituents and Q' is lower-alkyl, 1-oxo-4(or 3)-pyridyl or 1-oxo-4(or 3)-pyridyl having one or two lower-alkyl substituents.

3. The process which comprises heating cyclic alkylidenyl N-(6-Q'-1-oxo-2-pyridyl)aminomethylenemalonate to produce 1,4-dihydro-4-oxo-7-Q'-1,8-naphthyridine-8-oxide, where Q' is lower-alkyl, 1-oxo-4(or 3)-pyridyl or 1-oxo-4(or 3)-pyridyl having one or two lower-alkyl substituents.

4. The process which comprises converting 1,4-dihydro-4-oxo-7-Q'-1,8-naphthyridine-8-oxide to produce 1,4-dihydro-4-oxo-7-Q-1,8-naphthyridine, where Q' is lower-alkyl, 1-oxo-4(or 3)-pyridyl or 1-oxo-4(or 3)-pyridal having one or two lower-alkyl substituents and Q is lower-alkyl, 4(or 3)-pyridyl or 4(or 3)-pyridyl having one or two lower-alkyl substituents.

5. The process which comprises reacting cyclic alkylidene N-(6-Q-2-pyridyl)aminomethylenemalonate with an oxidizing agent capable of converting pyridines to pyridine N-oxides to produce cyclic alkylidenyl N-(6-Q'-1-oxo-2-pyridyl)-aminomethylenemalonate and heating said 6-Q'-1-oxo-2-pyridyl compound to produce 1,4-dihydro-4-oxo-7-Q'-1,8-naphthyridine-8-oxide, where Q is lower-alkyl, 4(or 3)-pyridyl or 4(or 3)-pyridyl having one or two lower-alkyl substituents and Q' is lower-alkyl, 1-oxo-4(or 3)-pyridyl or 1-oxo-4(or 3)-pyridyl having one or two lower-alkyl substituents.

6. The process which comprises heating cyclic alkylidenyl N-(6-Q'-1-oxo-2-pyridyl)aminomethylenemalonate to produce 1,4-dihydro-4-oxo-7-Q'-1,8-naphthyridine-8-oxide and converting said 8-oxide to produce 1,4-dihydro-4-oxo-7-Q-1,8-naphthyridine, where Q is lower-alkyl, 4(or 3)-pyridyl or 4(or 3)-pyridyl having one or two lower-alkyl substituents and Q' is lower-alkyl, 1-oxo-4(or 3)-pyridyl or 1-oxo-4(or 3)-pyridyl having one or two lower-alkyl substituents.

7. The process according to claim 1 where alkylidenyl is isopropylidenyl and lower alkyl is methyl.

8. The process according to claim 2 where alkylidenyl is isopropylidenyl and lower-alkyl is methyl.

9. The process according to claim 3 where alkylidenyl is isopropylidenyl and lower-alkyl is methyl.

10. The process according to claim 4 where alkylidenyl is isopropylidenyl and lower-alkyl is methyl.

11. The process according to claim 5 where alkylidenyl is isopropylidenyl and lower-alkyl is methyl.

12. The process according to claim 6 where alkylidenyl is isopropylidenyl and lower-alkyl is methyl.

* * * * *

UNITED STATES PATENT OFFICE
CERTIFICATE OF CORRECTION

PATENT NO. : 3,856,800
DATED : December 24, 1974
INVENTOR(S) : Robert K. Bair

It is certified that error appears in the above-identified patent and that said Letters Patent are hereby corrected as shown below:

Title page, Primary Examiner - "Alan L. Rothman" should read -- Alan L. Rotman -- and Agent "E. Woodrow Wyatt" should read -- B. Woodrow Wyatt --.

Column 15, line 31, "-pyridal" should read -- -pyridyl --.

Signed and Sealed this second Day of December 1975

[SEAL]

Attest:

RUTH C. MASON
Attesting Officer

C. MARSHALL DANN
Commissioner of Patents and Trademarks